United States Patent [19]

Ohashi et al.

[11] Patent Number: 4,773,216

[45] Date of Patent: Sep. 27, 1988

[54] FLOW DIVIDER VALVE FOR HYDRAULIC SYSTEM IN WORKING VEHICLES

[75] Inventors: Ryota Ohashi, Sakai; Masahisa Kawamura; Jiro Shibata, both of Amagasaki, all of Japan

[73] Assignee: Kanzaki Kokykoki Mfg. Co. Ltd., Amagasaki, Japan

[21] Appl. No.: 818,285

[22] Filed: Jan. 13, 1986

[30] Foreign Application Priority Data

Jan. 22, 1985 [JP] Japan ............... 60-7591[U]
Mar. 29, 1985 [JP] Japan ............... 60-46487[U]

[51] Int. Cl.$^4$ .................. B62D 5/08; F15B 13/06
[52] U.S. Cl. ....................... 60/422; 91/532; 91/514
[58] Field of Search .......... 91/532, 516, 514; 60/422; 180/132

[56] References Cited

U.S. PATENT DOCUMENTS

| | | | |
|---|---|---|---|
| 2,737,196 | 3/1956 | Eames | 91/516 X |
| 3,841,095 | 10/1974 | Baker | 91/516 X |
| 4,070,857 | 1/1978 | Wible | 91/516 X |
| 4,174,018 | 11/1979 | Liebert et al. | 91/532 X |
| 4,206,689 | 6/1980 | Peterson | 91/516 |
| 4,213,511 | 7/1980 | Rubenstein et al. | 180/139 |
| 4,244,184 | 1/1981 | Baldauf et al. | 91/532 |
| 4,256,142 | 3/1981 | Hancock | 91/532 X |
| 4,430,926 | 2/1984 | Wallace | 91/516 |
| 4,573,319 | 3/1986 | Chichester | 91/516 |

FOREIGN PATENT DOCUMENTS 51-198404 12/1982 Japan.

Primary Examiner—Robert E. Garrett
Assistant Examiner—George Kapsalas

[57] ABSTRACT

In a working vehicle comprising a hydraulic power steering cylinder (25) and hydraulic lift cylinder (31), a novel hydraulic system is employed which comprises first and second flow control valve means (47, 48; 147, 148; 247, 248; 347, 348), each dividing its inflow into two flows. These valve means are connected in a fashion such that output flow of a single pump (43) driven by engine (10) is first divided into two output flows one of which is then divided by the second valve means. Further, one of the output flows of the second valve means is directed towards the steering cylinder whereas the other of output flows of the both valve means are directed towards the lift cylinder.

The connection is such that, while a predetermined constant flow is secured for the steering cylinder at the normal engine speeds, a flow is necessarily secured for a relatively quick operation of the lift cylinder already at a low engine speed.

3 Claims, 5 Drawing Sheets

FLOW DIVIDER VALVE FOR HYDRAULIC SYSTEM IN WORKING VEHICLES

BACKGROUND OF THE INVENTION

This invention relates to a hydraulic system employed in working vehicles performing for example goods loading, mowing, reaping, earth moving operations and the like.

More particularly the present invention relates to a hydraulic system for use in a working vehicle which comprises a hydraulic power steering mechanism, including a power cylinder, and a hydraulic lift mechanism including a lift cylinder, the power cylinder and lift cylinder being powered by a single pump driven by the engine.

In general, such hydraulic system is fashioned such that it comprises a flow divider means for dividing output flow of a single pump into two flows one of which is directed towards the power cylinder and the other of which is directed towards the lift cylinder. Because it is required for a stable and safe steering of vehicle to turn vehicle steering wheels or front wheels with a predetermined constant rate, such flow divider means is fashioned in many cases so that it operates to secure a predetermined constant flow or flow rate for the power cylinder so as to operate such cylinder with a predetermined constant speed or rate. Thus, flow control valve means is provided which divides output flow of a single pump into a predetermined constant flow to be directed towards power cylinder and a surplus flow in excess of such constant flow. Lift cylinder of a hydraulic lift mechanism is thus operated by the surplus flow having a value substracted the predetermined constant flow from pump output flow.

Flow control valve means of the type set forth above does not provide any flow in its surplus flow outlet port when output flow of a single pump is less than a predetermined constant flow to be secured at the constant flow outlet port of such valve means. In a hydraulic system in which such flow control valve means is employed, lift cylinder of a hydraulic mechanism cannot thus be operated when engine speed is very low so that output of a single pump driven by engine is less than a predetermined constant flow to be secured for operating power steering cylinder with a predetermined constant rate. Within some low range of engine speed, flow of fluid directed towards the lift cylinder is very small so that such cylinder is operated to extend at a very small rate. Such slow extension of lift cylinder will result in a very slow lifting of working implement to be lifted by hydraulic lift mechanism.

Lifting of a working implement which is connected pivotally to a working vehicle so as to be lifted and lowered by hydraulic lift mechanism is often required even at a low speed of engine and even in an idling condition of engine. For example, such working implement is usually lifted in an idling condition of engine before working vehicle is put out of garage. During a working operation which is performed at a creep speed of vehicle, a quick lifting of working implement is required or at least desirable in response to an emergency. It is thus seen that inconvenience has been experienced.

SUMMARY OF THE INVENTION

Accordingly, a primary object of the present invention is to provide a novel hydraulic system for use in working vehicles which permits a relatively quick lifting of working implement at a low speed range of engine while permitting fluid supply of a predetermined constant rate to power steering cylinder at the normal speeds of engine.

An attendant object is to provide a hydraulic system which attains the primary object set forth above without complicating structure of the system.

According to the present invention, a pair of or first and second flow control valve means are provided each of which divides its inflow into two output flows. One of these flow control valve means is fashioned such that it divides its inflow into a predetermined constant flow and a surplus flow in excess of such constant flow. The other flow control valve means is fashioned such that it divides its inflow into first and second proportional flows of a predetermined ratio or such that it divides its inflow also into a predetermined constant flow and a surplus flow in excess of such constant flow.

The inlet port of first flow control valve means is connected to a single pump. The inlet port of second flow control valve means is connected to one of the outlet ports of first flow control valve means, whereas one of the outlet ports of second flow control valve means is connected to power steering cylinder. Both of the other outlet ports of first and second flow control valve means are connected to lift cylinder of a hydraulic lift mechanism. The connection is such that flow is directed towards lift cylinder already at the start of engine and is increased with the increase of engine speed while a predetermined constant flow is directed towards power steering cylinder at the normal speeds of engine.

Consequently, a significant flow or flow rate is secured for operating the lift cylinder at a low engine speed at which output flow of the single pump is relatively poor. Lift cylinder may thus be operated even at such low engine speed so as to lift a working implement relatively quickly. Although flow or flow rate directed towards power steering cylinder at a low speed range of engine is reduced correspondingly, vehicle is travelled at such low speed range necessarily with a very low speed so that a reduced speed of turning of vehicle steering wheels due to the reduced flow of actuating fluid for power cylinder will cause no dangerous state. At the normal speeds of engine, a predetermined constant flow is directed towards power steering cylinder so that such cylinder may be operated with a predermined constant speed or rate for a stable and safe steering.

As described before, a flow control valve means similar to one of the first and second control valve means employed according to the present invention has generally been employed in a hydraulic system according to the prior art. The present invention will thus employ only one additional flow control valve means. The first and second flow control valve means may be disposed in a single valve casing together with fluid passages between such two valve means.

In an aspect of the present invention, while flow control valve means of the type employed in the prior art system is employed as one of such two valve means, the other valve means is fashioned such that it divides its inflow into two proportional flows. Such additional flow control valve means may be constructed in a simple fashion such that it includes two orifices for dividing the inflow into two proportional flows of a predetermined ratio.

In another aspect of the present invention, both of the first and second flow control valve means are of the type employed in the prior art system. Thus, substantial parts may be made common to both of the first and second valve means.

The hydraulic system according to the present invention may thus be of a simple structure which will require little additional cost.

BRIEF DESCRIPTION OF THE DRAWINGS

Other features of the present invention and attendant advantages thereof will become more readily apparent from the following descriptions taken in conjunction with the accompanying drawings in which.

DESCRIPTION OF THE PREFERRED EMBODIMENTS

Vehicle Structure

Figure 1:
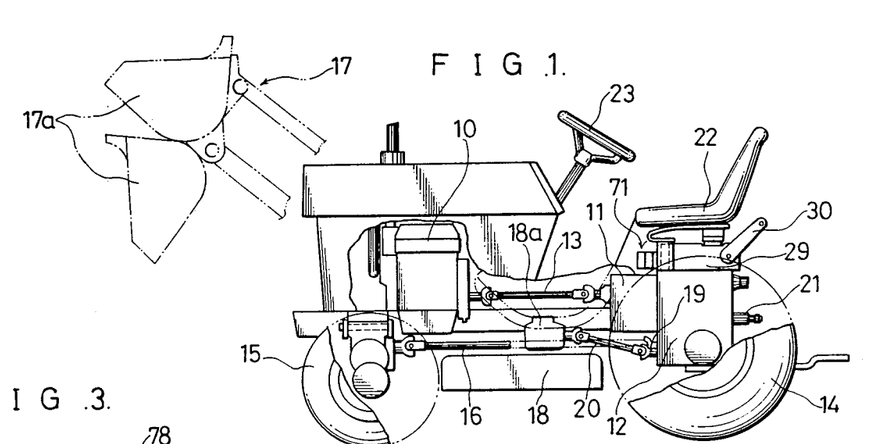
FIG. 1 is a schematic side view, partially cut away, of a working vehicle in which a first embodiment of the hydraulic system according to the present invention is employed.

FIG. 1 shows schematically a working vehicle which is a relatively small tractor and in which a first preferred embodiment of the hydraulic system according to the present invention is employed.

As shown in FIG. 1, an engine 10 is mounted on the front of vehicle. On the rear of the vehicle are mounted a hydrostatic transmission 11 and a transmission case 12 which are in an overlapped relationship with each other in the longitudinal direction of vehicle. A transmission shaft 13 is provided for transmitting power from engine 10 to the hydrostatic transmission 11 from which power is in turn transmitted into transmission case 12. The vehicle shown is moved by driving left and right rear wheels 14 supported by the transmission case 12 and, when required, by driving also left and right front wheels 15 through a transmission shaft 16 for transmitting power from the inside of transmission case 12 to the front wheels.

The vehicle shown is fashioned such that it may be equipped with a front loader 17 having a liftable and tiltable bucket 17a at the front of vehicle, a mower 18 at a middle of and below the vehicle, and another working implements such as rotary tiller and grass collector at the rear of vehicle. For driving the mower 18, a mid PTO shaft 19 is provided which extends forwardly from the transmission case 12 and is connected to a gear box 18a for driving mower 18 through a transmission shaft 20. For driving a working implement drawn by the vehicle, a rear PTO shaft 21 is provided which extends rearwardly from the transmission case 12.

Hydraulic Power Steering Mechanism

Figure 2:
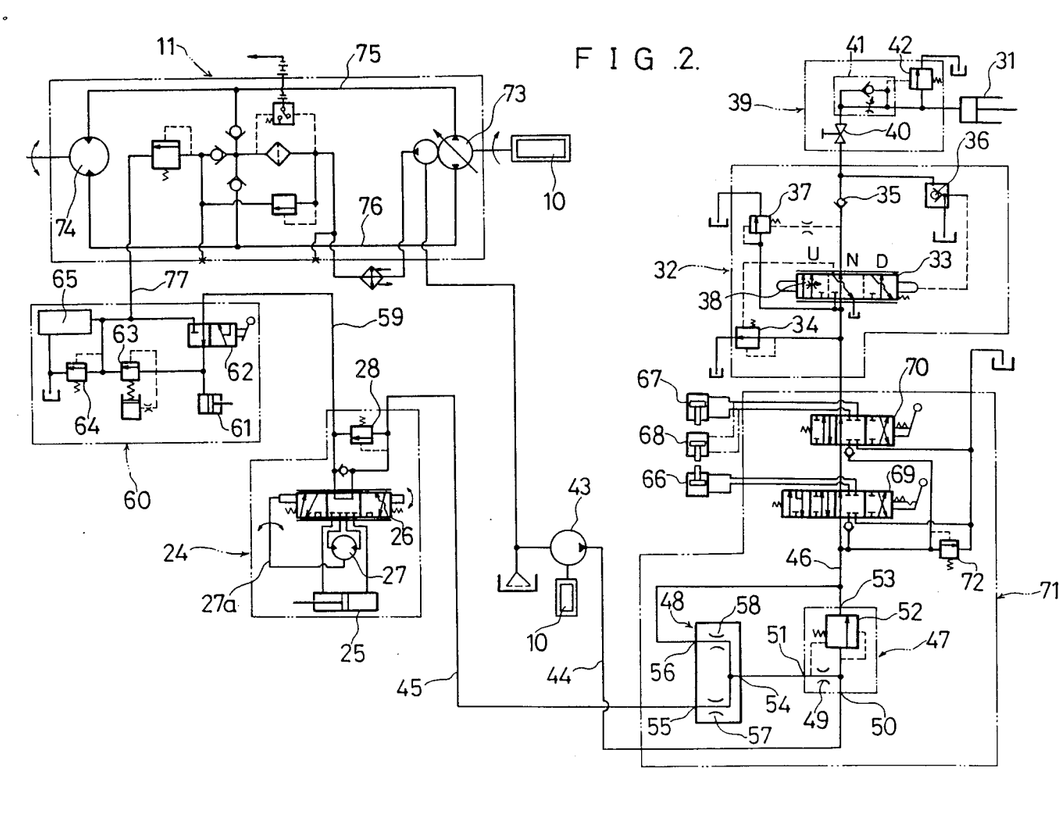
FIG. 2 is a diagram showing fluid circuit employed in the vehicle shown in FIG. 1.

The vehicle shown in FIG. 1 is steered by operator on a seat 22, located above the transmission case 12, by means of steering wheel 23 which, when handled, operates to turn the front wheels 15 through a hydraulic power steering mechanism 24 shown in FIG. 2.

As shown in FIG. 2, the power steering mechanism 24 includes a power cylinder 25 for turning the front wheels selectively into one or another direction and a directional control valve 26 which is displaced by the steering wheel 23 shown in FIG. 1 so as to control supply and drainage of fluid with respect to power cylinder 25. The control valve 26 shown is structured as a servo valve which is returned automatically to its neutral position by a metering motor 27 via feedback means 27a when the power cylinder 25 has been extended or contracted by an amount corresponding to the angle of revolution of the steering wheel 23. Power steering mechanism further includes a relief valve 28 for determining fluid pressure applied to the power cylinder 25 and metering motor 27.

Hydraulic Lift Mechanism

A working implement such as rotary tiller or grass collector which is selectively connected to the rear end of the vehicle by means of a link mechanism (not shown) so as to be drawn by the vehicle is selectively lifted and lowered by a hydraulic lift mechanism 29 mounted on the top of transmission case 12, as shown in FIG. 1. This mechanism 29 has a pair of left and right lift arms 30 which are, in use, pivotally connected to the link mechanism referred to above through a pair of tie rods (not shown).

As is usual, the hydraulic lift mechanism 29 includes a hydraulic lift cylinder 31 shown in FIG. 2. This lift cylinder 31 is operated so as to lift and lower the lift arms 30 under a control of control valve means 32 which includes a directional control valve 33 having three positions, namely neutral position N, implement-lifting position U and implement-lowering position D. The control valve means 32 further includes an unloader valve 34 for unloading fluid pressure at the neutral position N and lowering position D of control valve 33, non-return check valve 35 for preventing return of fluid from the lift cylinder 31 at the neutral position N of control valve 33, and unloader check valve 36 which, when the control valve 33 is displaced to the lowering position D, is displaced together to its open position so as to permit drainage of fluid from the lift cylinder 31. In the control valve means 32 shown, a relief valve 37 is provided to which fluid pressure in the downstream of control valve 33 is applied as back pressure so that it regulates the flow rate of fluid supplied to the lift cylinder 31 at the lifting position U of control valve 33 in cooperation with a variable area throttle 38 which is incorporated in such control valve 33 so as to be inserted in the fluid supply passage when the valve 33 is displaced to its lifting position U.

As also shown in FIG. 2, a final valve mechanism 39 is interposed between the control valve means 32 and lift cylinder 31. This valve mechanism 39 includes a stop valve 40 for selectively closing the fluid passage so as to stop the lift cylinder 31 when the lift mechanism is not used, slow-return valve means 41 having in-parallel connected check valve and adjustable area throttle for assuring a slow contraction of lift cylinder 31 while permitting a quick extension of such cylinder, and overload-relief valve 42 for preventing the lift cylinder 31 from being subjected to an excessive fluid pressure.

Hydraulic Circuit

FIG. 2 illustrates hydraulic circuit provided in the vehicle shown in FIG. 1.

A single hydraulic pump 43 which is driven by the engine 10 is provided for supplying fluid under pressure to both of the power cylinder 25 and lift cylinder 31. Flow of fluid coming from such pump 43 through a supply path 44 is divided into two controlled flows one of which is directed towards the power cylinder 25 through a branch path 45 and the other of which is directed towards the lift cylinder 31 through another branch path 46. For this, first and second flow control valve means 47 and 48 are provided each of which has an inlet port and two outlet ports.

In the hydraulic system shown in FIG. 2, the first flow control valve means 47 comprises an orifice 49, incorporated in fluid passage between the inlet port 50 and one of the outlet ports or constant flow outlet port 51, and a relief valve 52 incorporated in fluid passage between the inlet port 50 and the other outlet port or surplus flow outlet port 53. Fluid pressure in the upstream of relief valve 52 is applied to such relief valve 52 from one direction as a pilot pressure against biasing force of valve spring, whereas fluid pressure in the downstream of orifice 49 is applied to the relief valve 52 from the other direction as another pilot pressure. It is thus seen that the first flow control valve means 47 divides its inflow into a predetermined constant flow flowing-out from one outlet port 51 and a surplus flow flowing-out from the other outlet port 53. The inlet port 50 of first valve means 47 is connected to the pump via supply path 44 and the surplus flow outlet port 53 of such valve means is connected to the branch path 46 and, therefore, to the lift cylinder 31. When inflow of the first valve means 47 supplied by pump 43 is less than the predetermined flow or flow rate to be secured at the constant flow outlet port 51, all of the fluid flowing into the first valve means 47 is directed towards such outlet port 51 so that no flow is obtained in the surplus flow outlet port 53.

The second flow control valve means 48 shown in FIG. 2 comprises an inlet port 54 and first and second control flow outlet ports 55 and 56 and includes therein a first orifice 57, incorporated between the ports 54 and 55, and a second orifice 58 incorporated between the ports 54 and 56. It is thus seen that the second flow control valve means 48 divides its inflow into first and second proportional control flows of a predetermined ratio. Such flow ratio is determined by the relationship between open or flow areas of the first and second orifices. The inlet port 54 of second valve means 48 is connected to the constant flow outlet port 51 of first valve means 47. The first control flow outlet port 55 of such second valve means 48 is connected to the branch path 45 and, therefore, to the power cylinder 25, whereas the second control flow outlet port 56 is connected to another branch path 46 and, therefore, to the lift cylinder 31.

It is thus seen that, even when inflow of the first valve means 47 is less than the predetermined flow to be secured at the constant flow outlet port 51 of first valve means 47 so that no fluid is supplied from such valve means 47 to the branch path 46, some flow is necessarily supplied from the second valve means 48 or the second control flow outlet port 56 thereof to such branch path 46 which leads fluid towards the lift cylinder 31. This and another operations will be described in great detail later by referring to FIG. 9.

The hydraulic circuit or system shown in FIG. 2 is fashioned such that fluid supplied to the power steering mechanism 24 is then supplied through a fluid path 59 to a clutch-actuating mechanism 60 for a friction clutch (not shown) which is disposed within transmission case 12 shown in FIG. 1. Such actuating mechanism 60 includes an actuator cylinder 61, directional control valve 62 for such cylinder 61, relief valve 63 for determining fluid pressure applied to the cylinder 61, and another or secondary relief valve 64 for determining fluid pressure of lubricant fluid supplied to parts 65 to be lubricated such as friction elements of the clutch.

The hydraulic system shown is further fashioned such that fluid supplied to the branch path 46 through the flow control valve means 47 and 48 may also be used for actuating a bucket-lifting cylinder 66 for lifting and lowering the bucket 17a shown in FIG. 1, bucket-tilting cylinder 67 for tilting such bucket 17a and mower-lifting cylinder 68 for lifting and lowering the mower 18 shown in FIG. 1 which is supported by the vehicle through a link mechanism (not shown). A directional control valve 69 is provided for controlling operation of the bucket-lifting cylinder 66 and another directional control valve 70 is provided for controlling operation of each of the bucket-tilting cylinder 67 and mower-lifting cylinder 68 one of which is used selectively at a time. These directional control valves 69 and 70 are fashioned such that they permits at their neutral positions flow of fluid towards the lift cylinder 31 through the path 46 which is connected to such cylinder through the control valve means 32 and final valve mechanism 39 referred to before. The first and second flow control valve means 47 and 48 and two directional control valves 69 and 70 are included in a valve assembly 71 which also includes a relief valve 72 for determining fluid pressure applied to each of the cylinders 31, 66, 67 and 68.

FIG. 2 also illustrates hydraulic elements of the hydrostatic transmission 11 shown in FIG. 1. As is conventional, this transmission 11 comprises variable displacement pump 73 and fixed displacement motor 74 which are connected with each other by a pair of fluid paths 75 and 76. A fluid drain path 77 from the hydrostatic transmission 11 is connected to parts 65 in the clutch-actuating mechanism 60 for supplementing lubricant fluid.

Valve Structure

The valve assembly 71 shown in FIG. 2 is fixedly mounted on the front of hydraulic lift mechanism 29, as shown in FIG. 1. This assembly 71 comprises three valve casings which are piled successively along a longitudinal direction of the vehicle. The foremost valve casing 78 is shown in FIGS. 3 to 8 and includes therein the first and second flow control valve means 47 and 48 and also relief valve 72 having been detailed by referring to FIG. 2. Another two valve casings include therein the directional control valves 69 and 70 shown in FIG. 2, respectively.

Structure of the flow control valve means will be detailed by referring to FIGS. 3 to 8.

Figure 3:
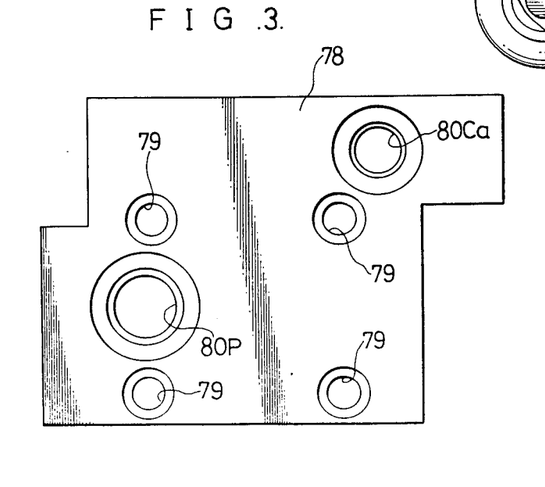
FIG. 3 is a front elevational view of a valve casing employed in the vehicle shown in FIG. 1.
Figure 4:
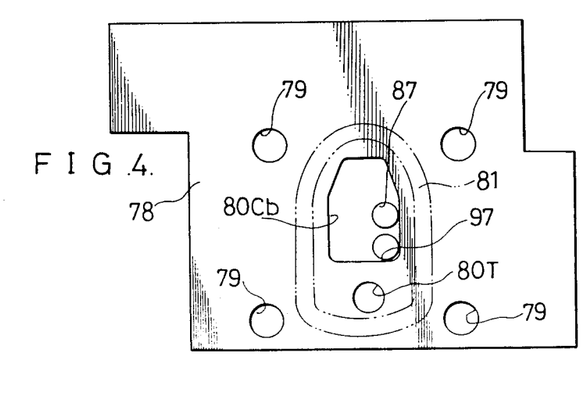
FIG. 4 is a rear elevational view of the valve casing shown in FIG. 3.

FIGS. 3 and 4 illustrate the front end face and rear end face of valve casing 78, respectively. This casing 78 is formed with bores 79 through which fastening bolts for fastening three valve casings of the valve assembly 71 to a head portion of the hydraulic lift mechanism 29 extend, an inlet port 80P and first outlet port 80Ca each of which opens at the front end face of casing 78, and a second outlet port 80Cb and drain port 80T each of which opens at the rear end face of casing 78. The inlet port 80P is connected to pump 43 through the supply path 44 (both shown in FIG. 2), whereas the first outlet port 80Ca is connected to power steering mechanism 24 through the branch path 45 (both shown in FIG. 2). The second outlet port 80Cb is connected via directional control valves 69 and 70 shown in FIG. 2, which are disposed in the two valve casings arranged behind the casing 78, to the control valve means 32 shown in FIG. 2 which is mounted on a side of the lift mechanism 29. The drain port 80T is connected via fluid passages (not shown), which are formed within the two valve casings referred to above, to the inside of transmission case 12 shown in FIG. 1 which is also used as a reservoir for fluid or oil. In FIG. 4, numeral 81 designates an endless groove which is formed to the front end face of valve casing arranged just behind the foremost casing 78 for the purpose of providing a seal ring between these casings.

FIGS. 5 to 8 illustrate the inside of valve casing 78. As shown in these figures, the first and second flow control valve means 47 and 48 and relief valve 72 having been described by referring to FIG. 2 are arranged within the casing 78 so that each of these valves extends along a direction across the casing 78. The second valve means 48 is disposed above the first valve means 47, whereas relief valve 72 is disposed at a side of such first valve means 47.

Figure 5:
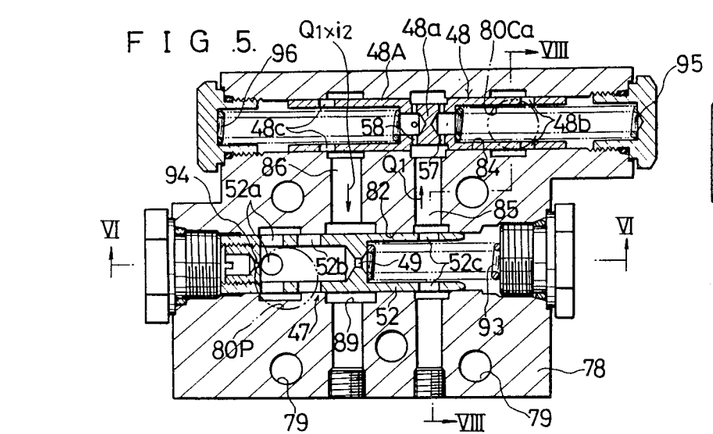
FIG. 5 is a sectional front view of the valve casing shown in FIGS. 3 and 4, showing valves in the casing.
Figure 6:
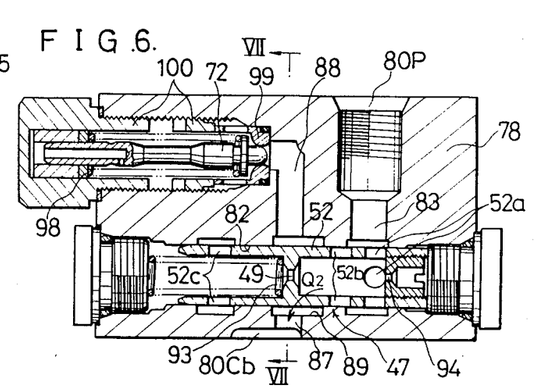
FIG. 6 is a sectional view taken along line VI—VI of FIG. 5.
Figure 7:
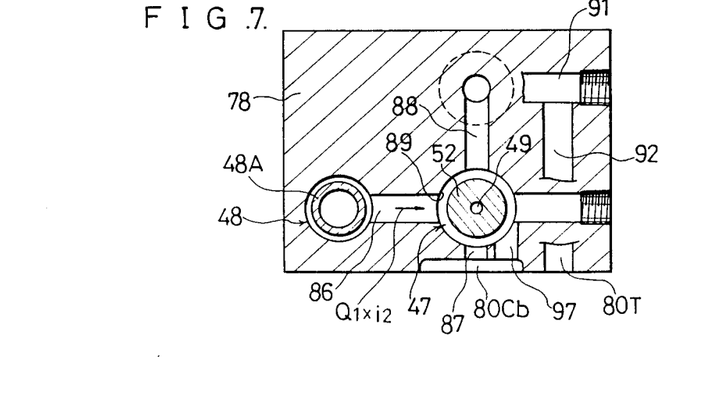
FIG. 7 is a sectional view taken along line VII—VII of FIG. 6.
Figure 8:
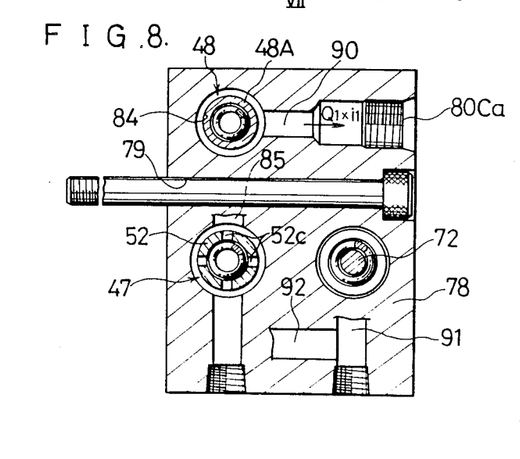
FIG. 8 is a sectional view taken along line VIII—VIII of FIG. 5.

Relief valve 52 of the first flow control valve means 47 is slidably disposed within a valve-receiving bore 82 which is communicated with the inlet port 80P via fluid passage 83, as best seen from FIG. 6. As shown in FIG. 5, valve-receiving bore 82 is communicated to another valve-receiving bore 84, within which the second flow control valve means 48 is slidably disposed, via a pair of fluid passages 85 and 86 which are spaced from each other in the direction across the casing 78. As shown in FIGS. 6 and 7, bore 82 is further communicated to the second outlet port 80Cb via fluid passage 87 and also to the upstream side of relief valve 72 via fluid passage 88 which is co-axial with the passage 87. Inner wall of the bore 82 has an annular recess 89 at a portion where passages 86, 87 and 88 are joined together. As shown in FIG. 8, valve-receiving bore 84 for the second valve means 48 is communicated at an appropriate portion thereof to the first outlet port 80Ca via fluid passage 90. The downstream side of relief valve 72 is communicated to the drain port 80T via fluid passages 91 and 92 shown in FIGS. 7 and 8.

Relief valve 52 of the first flow control valve means 47 is made hollow and includes therein a partition to which a perforation providing the orifice 49 described before by referring to FIG. 2 is formed. The relief valve 52 is further formed intermittently along its axial direction with three sets of radial perforations 52a, 52b and 52c, namely perforations 52a for communicating the upstream side of orifice 49 with the inlet port 80P via fluid passage 83, perforations 52b for communicating the upstream side of orifice 49 to the second outlet port 80Cb via the annular recess 89 and fluid passage 87, and perforations 52c for communicating the downstream side of orifice 49 to the second flow control valve means 48 via fluid passage 85. A valve spring 93 is provided which biases the relief valve 52 in cooperation with fluid pressure in the downstream of orifice 49 to move towards a direction such that communicating area between perforations 52b and fluid passage 87 is narrowed. Against such biasing of spring 93, fluid pressure in the upstream of orifice 49 is applied to the valve 52 through a throttled fluid passage 94 which is formed in a tubular member threadingly fitted in a base end portion of relief valve 52.

It is thus seen that the first flow control valve means 47 divides its inflow coming from the inlet port 80P through fluid passage 83 into two flows in a condition such that the relief valve 52 is displaced from the position shown in FIGS. 5 and 6 towards the spring 93 resulting in an overlapping between perforations 52b and annular recess 89. A constant flow $Q_1$ shown in FIG. 5 which is predetermined by a selection of the flow area of orifice 49 as well as the biasing force of spring 93 is obtained in fluid passage 85, whereas surplus flow $Q_2$ shown in FIG. 6 is obtained in fluid passage 87. When inflow from the inlet port 80P is less than the predetermined constant flow $Q_1$, the relief valve 52 remains at a position not to cause an overlapping between perforations 52b and annular recess 89 so that all of the fluid from the inlet port 80P is directed towards fluid passage 85.

As shown in FIG. 5, the second flow control valve means comprises a single hollow valve body 48A including therein a partition wall 48a by which a pair of hollow spaces are separately provided within the valve body 48A. The first orifice 57 having been described by referring to FIG. 2 is provided by first perforations which are formed to the single valve body 48A at one side of partition wall 48a so as to provide a throttled communication between fluid passage 85 and one of the hollow spaces within the valve body 48A, whereas the second orifice 58 having been described by referring to FIG. 2 is provided by second perforations which are formed to the single valve body 48A at the other side of partion wall 48a so as to provide a throttled communication between fluid passage 85 and the other of the hollow spaces within the valve body 48A. One of the hollow spaces within the valve body 48A is communinated by a set of perforations 48b formed thereto to the first outlet port 80Ca via fluid passage 90 shown in FIG. 8, whereas the other of the hollow spaces within the valve body 48A is communicated by another set of perforations 48c formed thereto to the second outlet port 80Cb via fluid passage 86, annular recess 89 and fluid passage 87. A pair of springs 95 and 96 are provided for biasing the second valve means 48 to move towards one and the other directions.

It is thus seen that the second flow control valve means 48 divides its inflow coming from the first valve means 47 through fluid passage 85 into two proportional flows one of which flows towards the first outlet port 80Ca and the other of which flows towards the second outlet port 80Cb. Ratio of such two flows is determined by the relationship between flow areas of the orifices 57 and 58, as already stated with reference to FIG. 2. Provided that such ratio is $i_1:i_2(i_1+i_2=1)$ and that inflow of the second valve means 48 is $Q_1$ shown in FIG. 5, flow having a value $Q_1 \times i_1$ shown in FIG. 8 is obtained in the first outlet port 80Ca and flow having a value $Q_1 \times i_2$ shown in FIGS. 5 and 7 is directed towards the second outlet port 80Cb. The latter flow $Q_1 \times i_2$ is joined with the flow $Q_2$ shown in FIG. 6 so that flow having a value $Q_2 + Q_1 \times i_2$ is obtained in the second outlet port 80Cb.

As shown in FIG. 7, the valve casing 78 is further formed therein with a fluid passage 97 which is arranged in parallel with the fluid passage 87 between the annular recess 89 and second outlet port 80Cb so that unrestricted fluid communication is always achieved between the recess 89 and port 80Cb. The annular recess 89 referred to above functions as the surplus flow outlet port 53 shown in FIG. 2 as well as a joint of fluid paths connected respectively to the surplus flow outlet port 53 and second control flow outlet port 56 shown in FIG. 2. The inlet port 50 and constant flow outlet port 51 shown in FIG. 2 are provided respectively by an annular recess or groove, located at the downstream end of fluid passage 83 shown in FIG. 6, and by an annular recess or groove located at the upstream end of fluid passage 85 shown in FIG. 5. The inlet port 54 of second valve means 48 shown in FIG. 2 is provided by an annular recess or groove located at the downstream end of fluid passage 85 shown in FIG. 5, whereas the first and second control flow outlet ports 55 and 56 shown in FIG. 2 are provided respectively by annular recesses or grooves located at the upstream ends of fluid passages 90 and 86 shown in FIGS. 8 and 5.

As shown in FIG. 6, the relief valve 72 is biased by valve spring 98 so as to engage a valve seat 99 which is fixed in position by an elongated hollow bolt 100 threadingly fitted in the valve casing 78. This relief valve 72 which is connected at one side to the second outlet port 80Cb via fluid passage 88, annular groove 89 and fluid passage 87 and at another side to the drain port 80T via fluid passages 91 and 92 operates to maintain a predetermined constant fluid pressure in the second outlet port 80Cb.

Operation

Figures 9, 10, 12, 13, 14:
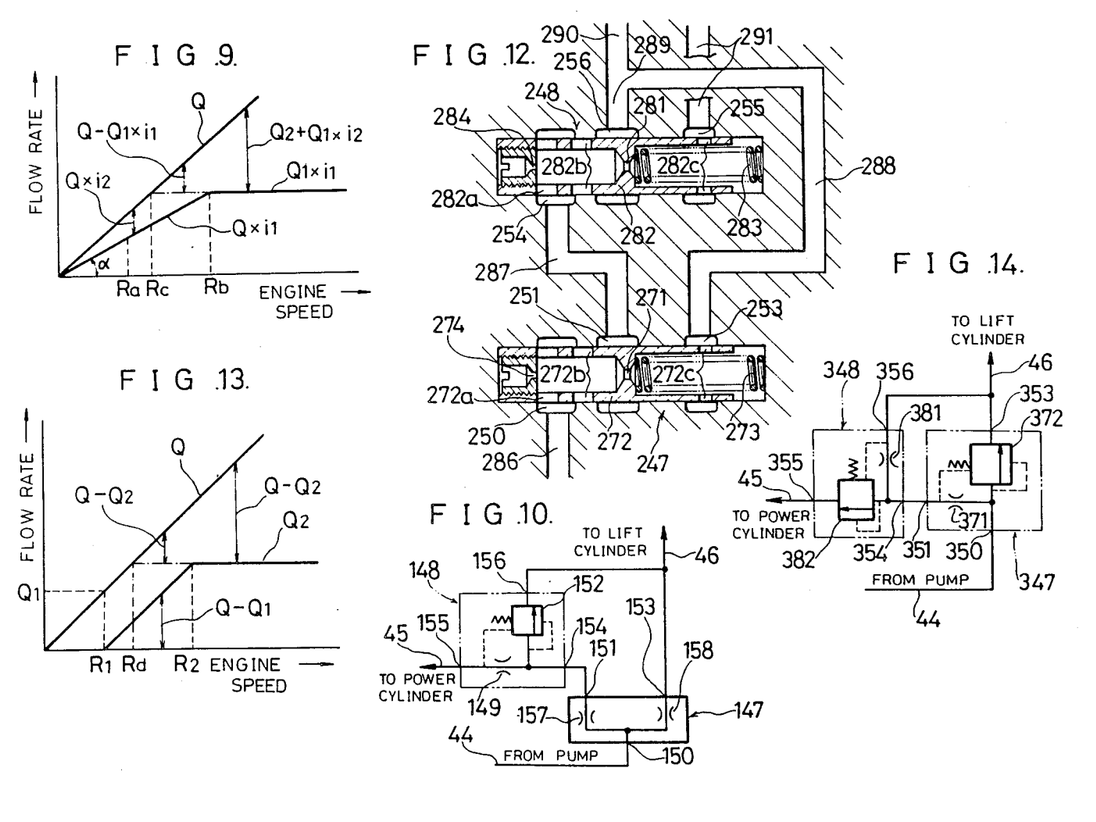
FIG. 9 is a schematic graph illustrating operation of the first embodiment shown in FIGS. 2 to 8.
FIG. 10 is a diagram showing a part of fluid circuit in which a second embodiment of the present invention is incorporated.
FIG. 12 a schematic sectional view showing a part of the third embodiment shown in FIG. 11.
FIG. 13 is a schematic graph illustrating operation of the third embodiment shown in FIGS. 11 and 12.
FIG. 14 is a diagram showing a part of fluid circuit in which a fourth embodiment of the present invention is incorporated.

In a condition in which a working implement such as rotary tiller to be lifted and lowered by means of hydraulic lift mechanism 29 is connected to the rear of the vehicle shown in FIG. 1, the hydraulic system shown in FIGS. 2 to 8 operates as follows:

FIG. 9 illustrates schematically the relationship between rotation speed of engine 10 and output flow of hydraulic pump 43 as well as flow or flow rate supplied towards the power steering cylinder 25. In the abscissa, Ra designates minimum speed of engine 10 permitting a travel of the vehicle and Rb designates minimum speed at the normal speed range of engine operation. Output flow Q of pump 43 is increased with the increase of engine speed approximately at a constant rate.

Provided that flow or flow rate obtained in the constant flow outlet port 51 of the first valve means 47 within the normal range of engine speed is $Q_1$ and that the second valve means 48 divides its inflow into first and second control flows of a ratio $i_1:i_2$ $(i_1+i_2=1)$, flow or flow rate directed towards the power cylinder 25 at an engine speed within such normal speed range has a constant value $Q_1 \times i_1$. Provided that flow or flow rate obtained in the surplus flow outlet port 53 of the first valve means 47 within the normal range of engine speed is $Q_2(Q_2=Q-Q_1)$, flow or flow rate directed towards the lift cylinder 31 is $Q_2+Q_1 \times i_2$ and is thus increased with the increase of engine speed. It is thus seen that when the vehicle shown in FIG. 1 is steered at an engine speed within the normal range by rotating the steering wheel 23 so as to displace the directional control valve 26 shown in FIG. 2 into one or another operative position, the power cylinder 25 is always operated to extend or contract with a constant speed so as to turn the front wheels 15 at a predetermined constant rate.

In the low range of engine speed below the minimum speed Rb of the normal speed range, output flow Q of pump 43 is less than the constant flow $Q_1$. Accordingly, if a hydraulic system were employed which comprises only a flow control valve means corresponding to the first valve means 47 shown so as to secure the constant flow $Q_1 \times i_1$ for power cylinder 25 within the normal speed range of engine, no fluid would then be directed towards lift cylinder 31 at an engine speed below a speed Rc shown in FIG. 9, at which pump output flow Q is equal to $Q_1 \times i_1$, and flow having a little valve $Q-Q_1 \times i_1$ would be directed towards lift cylinder 31 at an engine speed between the speeds Rc and Rb. Contrarily to this, the hydraulic system shown in FIGS. 2 to 8 will secure a flow for the lift cylinder 31 having a significant value $Q \times i_2$ all over the low range of engine speed below Ra. It is thus seen that, when the directional control valve 33 shown in FIG. 2 is shifted into its implement-lifting position U at a low engine speed for operating the lift cylinder 31 to extend so as to lift a working implement drawn by the vehicle, the lift cylinder 31 will extend with a substantial speed so as to lift the working implement relatively quickly. Although flow directed towards power cylinder 25 in such low range of engine speed has a relatively low value $Q \times i_1$, vehicle is travelled necessarily with a very low speed in this low range of engine speed so that a reduded speed of turning of the front wheels 15 for steering will cause no dangerous state.

Incline angle $\alpha$ shown in FIG. 9 which represents ratio of increase in flow directed towards power cylinder 31 to increase in engine speed within the low range of such engine speed may be varied optionally by varying relationship or ratio between the flow areas of the first and second orifices 57 and 58 in the second flow control valve means 48.

Second Embodiment

FIG. 10 illustrates a part of an alternative or second embodiment of the hydraulic system according to the present invention. As is the case in the first embodiment, first and second flow control valve means 147 and 148 are provided for dividing flow coming from a single pump into two controlled flows one of which is directed towards power steering cylinder via a branch path 45 and the other of which is directed towards lift cylinder of hydraulic lift mechanism via another branch path 46.

In the second embodiment shown in FIG. 10, however, arrangement of the first and second flow control valve means is reversed in comparison with the case of the first embodiment. Thus, the first flow control valve means 147 includes therein first and second orifices 157 and 158 corresponding to the first and second orifices 57 and 58 in the second flow control valve means 48 employed in the first embodiment and thus divides its inflow, flowing into inlet port 150 via fluid supply path 44, into first and second proportional control flows of a predetermined ratio. The second flow control valve means 148 shown in FIG. 10 includes therein an orifice 149 and relief valve 152 corresponding to the orifice 49 and relief valve 52 in the first flow control valve means 47 employed in the first embodiment and thus divides its inflow, flowing into its inlet port 154 from the first control flow outlet port 151 of the first valve means 147, into a predetermined constant flow and a surplus flow in excess of such constant flow.

Similarly to the case of the first embodiment, one of the outlet ports or second control flow outlet port 153 of the first valve means 147 and also one of the outlet ports or surplus flow outlet port 156 of the second valve means 148 are connected to the lift cylinder via branch path 46 while the other or constant flow output port 155 of the second valve means 148 is connected to the power cylinder via branch path 45.

In operation, the first valve means 147 will assure already at a low range speed of engine some flow which is directed towards the lift cylinder via branch path 46. Such flow has a value $Q \times i_2$, provided that ratio of flow through the first orifice 157 to flow through the second orifice 158 is $i_1:i_2$ ($i_1+i_2=1$) and that inflow from the pump is Q. The second valve means 148 will assure at the normal speeds of engine a predetermined constant flow which is directed towards the power cylinder via branch path 45. Here again, a characteristic similar to that shown in FIG. 9 may thus be obtained.

The first and second flow control valve means 147 and 148 shown in FIG. 10 may be constructed similarly to the second and first flow control valve means 48 and 47 shown in FIGS. 5 to 8. The first valve means 147 may thus be constructed similarly to the valve means 48 such that it comprises a single valve body which is biased towards one and the other directions by a pair of springs and which is formed with first and second perforations providing the first and second orifices 157 and 158 shown in FIG. 10. Such single valve body will contribute to simplify the structure of first valve means 147.

Third Embodiment

Figure 11:
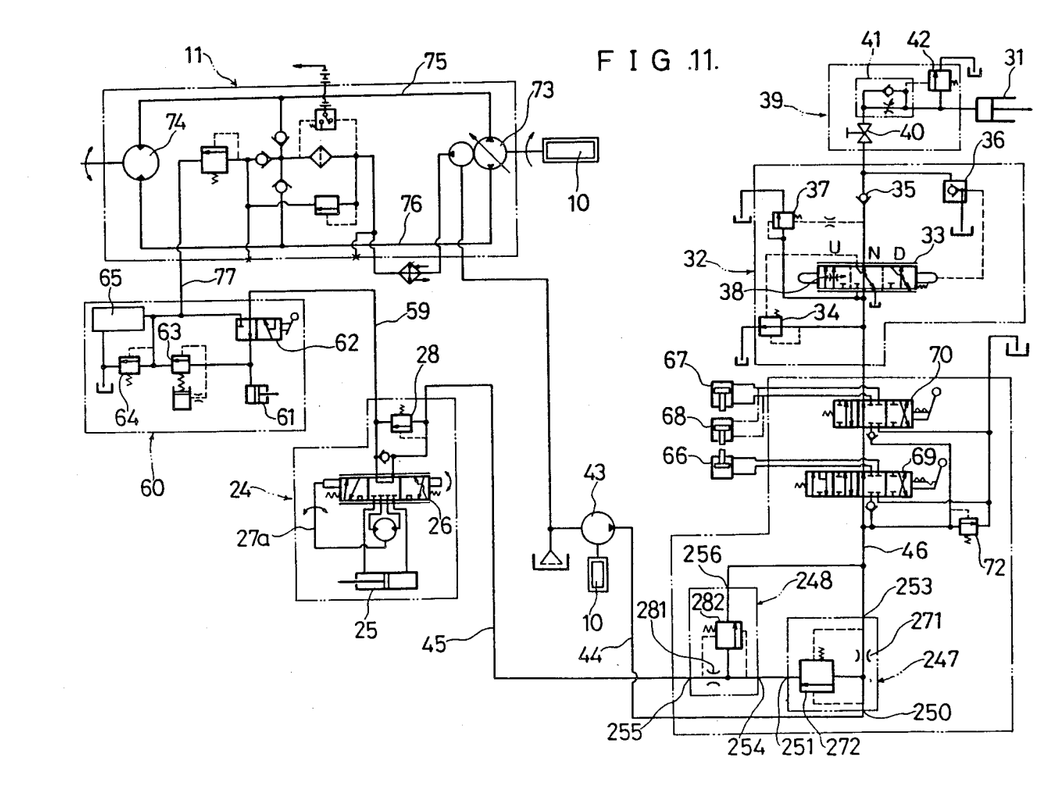
FIG. 11 is a diagram showing fluid circuit in which a third embodiment of the present invention is incorporated.

FIGS. 11 and 12 illustrates a third embodiment of the hydraulic system according to the present invention. Here again, first and second flow control valve means 247 and 248 are provided for dividing flow from a single pump 43 driven by engine 10 into two controlled flows one of which is directed towards power steering cylinder 25 via a branch path 45 and the other of which is directed towards lift cylinder 31 via another branch path 46.

In the third embodiment shown in FIGS. 11 and 12, each of these flow control valve means 247 and 248 comprises an orifice 271, 281, incorporated between inlet port 250, 254 and constant flow outlet port 253, 255 of each of the valve means 247 and 248, and a relief valve 272, 282 incorporated between inlet port 250, 254 and surplus flow outlet port 251, 256 of each of the valve means 247 and 248. Each of the relief valves 272 and 282 is fashioned such that, while fluid pressure in the upstream thereof is applied against biasing of valve spring as a pilot pressure, fluid pressure in the downstream of orifice 271, 281 is applied from the opposite direction as another pilot pressure. It is thus seen that each of the first and second valve means 247 and 248 operates similarly to each of the valve means 47 shown in FIG. 2 and valve means 148 shown in FIG. 10 so that it divides its inflow into a predetermined constant flow and a surplus flow in excess of such constant flow.

As shown in FIG. 11, the constant flow outlet port 253 of first valve means 247 is connected to lift cylinder 31 via branch path 46 while the inlet port 250 of such valve means 247 is connected to the pump 43 via fluid supply path 44. The inlet port 254 of second control valve means 248 is connected to the surplus flow outlet port 251 of the first valve means 247. The constant flow outlet port 255 of second valve means 248 is connected to power cylinder 25 via branch path 45, whereas the surplus flow outlet port 256 of such valve means 248 is connected to lift cylinder 31 via branch path 46. Another parts of the hydraulic circuit shown in FIG. 11 are fashioned similarly to the corresponding parts of the hydraulic circuit shown in FIG. 2 and are designated by like numerals.

FIG. 12 schematically illustrates the embodical structures of first and second flow control valve means 247 and 248 and fluid passages associated therewith. Each of the valve means 247, 248 has a structure substantially same as that of the flow control valve means 47 shown in FIGS. 5 and 6.

Each of the relief valves 272 and 282 is thus slidably disposed within a valve-receiving bore in a valve casing and includes therein a perforation for providing the orifice 271, 281 which is communicated at the upstream side thereof to the inlet port 250, 254 and at the downstream side to the constant flow outlet port 253, 255. Each of such relief valves 272 and 282 is further formed with three sets of radial perforations 272a, 282a, 272b, 282b and 272c, 282c which correspond to radial perforations 52a, 52b and 52c shown in FIGS. 5 and 6. Valve spring 273, 283 and throttled fluid passage 274, 284 which correspond to valve spring 93 and throttled fluid passage 94 shown in FIGS. 5 and 6 are also provided. Each of the valve means 247 and 248 thus operates similarly to the valve means 47 shown in FIGS. 5 and 6.

To the inlet port 250 of first valve means 247 is communicated a fluid supply passage 286 which forms a part of the fluid supply path 44 shown in FIG. 11. Another fluid passage 287 is formed in the valve casing for communicating between the surplus flow outlet port 251 of first valve means 247 and the inlet port 254 of second valve means 248. The constant flow outlet port 253 of first valve means 247 and the surplus flow outlet port 256 of second valve means 248 are communicated respectively via fluid passages 288 and 289 to a fluid passage 290 which forms a part of the branch path 46 shown in FIG. 11. To the constant flow outlet port 255 of second valve means 248 is communicated a fluid path 291 which forms a part of the branch path 45 shown in FIG. 11.

FIG. 13 schematically illustrates operation of the hydraulic system shown in FIGS. 11 and 12 in a manner similar to FIG. 9.

Provided that the predetermined constant flows to be obtained in the constant flow outlet ports 253 and 255 of first and second control valve means 247 and 248 are $Q_1$ and $Q_2$, no flow is obtained in the surplus flow outlet port 251 of first valve means when engine speed is lower than the speed $R_1$ shown at which output flow Q of the pump 43 is made equal to $Q_1$. All of the fluid coming from the pump 43 is thus directed at an engine speed below $R_1$ from the constant flow outlet port 253 towards lift cylinder 31 via branch path 46.

In FIG. 11, $R_2$ designates an engine speed at which output flow Q of the pump 43 is made equal to the sum of $Q_1$ and $Q_2$ ($Q=Q_1+Q_2$). When engine 10 is operated at a speed between $R_1$ and $R_2$, inflow of the second valve means 248 which comes from the surplus flow outlet port 251 is less than the predetermined flow $Q_2$ so that all of such inflow is directed towards the constant flow outlet port 255 of second valve means 248. It is thus seen that, while the constant flow $Q_1$ is directed towards lift cylinder 31 via the branch path 46, a flow having a value $Q-Q_1$ is directed towards power cylinder 25 via branch path 45 at such engine speed between $R_1$ and $R_2$.

At an engine speed of normal range above the speed $R_2$, the predetermined constant flow $Q_2$ is directed from the constant flow outlet port 255 of second valve means 248 towards power cylinder 25 via the branch path 45. Flow having a value $Q-Q_2$ is thus directed from the constant flow outlet port 253 of first valve means 247 and surplus flow outlet port 256 of second valve means 248 towards the lift cylinder 31 via branch path 46.

If the first valve means 247 were omitted and only the second valve means 248 shown is employed for securing the constant flow $Q_2$ to be directed to the power cylinder 25 within the normal speed range of engine, no fluid would then be directed towards lift cylinder 31 at an engine speed below a speed Rd shown in FIG. 13, at which output flow Q of the pump 43 is equal to $Q_2$, and flow having a little value $Q-Q_2$ would be directed towards lift cylinder 31 at an engine speed between Rd and $R_2$. Contrarily to this, the hydraulic system shown in FIGS. 11 and 12 will secure a significant flow for the lift cylinder 31 all over the low range of engine speed below $R_2$. Consequently, lift cylinder 31 may be operated at such low range of engine speed so as to lift a working implement relatively quickly. At the normal engine speeds, power steering cylinder 25 is operated at a predetermined rate or speed owing to the constant flow or flow rate $Q_2$ supplied to such cylinder 25.

The speed $R_1$ shown in FIG. 13 may be varied by varying the flow area of orifice 271 of the first valve means 247. Such speed $R_1$ is selected so that it has a value lower than the minimum speed of engine permitting a travel of the vehicle so as to permit the vehicle-steering even at a very low speed of vehicle. The speed $R_2$ shown in FIG. 13 may be varied by varying the flow area of orifice 281 of the second valve means 248. Similarly constructed first and second valve means 247 and 248 shown in FIG. 12 contribute to make considerable parts common to both of the valve means so as to reduce manufacturing cost.

Fourth Embodiment

FIG. 14 illustrates a part of a fourth embodiment of the hydraulic system according to the present invention. As is the case in the third embodiment, there are employed first and second flow control valve means 347 and 348 each having therein an orifice 371, 381 and relief valve 372, 382.

In the fourth embodiment shown in FIG. 14, however, connection with respect to the first and second valve means is reversed. Thus, while the inlet port 350 of first valve means 347 is connected to a single pump via fluid supply path 44 the surplus flow outlet port 353 of such valve means 347 is connected to hydraulic lift cylinder via branch path 46. The inlet port 354 of second valve means 348 is connected to the constant flow outlet port 351 of first valve means 347. The surplus flow outlet port 355 of second valve means 348 is connected to power steering cylinder via branch path 45, whereas the constant flow outlet port 356 of such second valve means 348 is connected to the lift cylinder via the branch path 46.

Provided that the predetermined constant flows to be obtained in the constant flow outlet ports 351 and 356 of first and second valve means 347 and 348 are $Q_1$ and $Q_2$, flow of $Q_1-Q_2$ is obtained in the surplus flow outlet port 355 of the second valve means 348 when output flow of the pump is larger than $Q_1$. As can be understood now, this flow of $Q_1-Q_2$ is also constant. Relationship between flow areas of orifices 371 and 381 is predetermined so that $Q_1$ is made larger than $Q_2$ by an amount such that $Q_1-Q_2$ corresponds to a constant flow rate to be supplied to the power steering cylinder at the normal engine speeds. At such normal engine speeds, such constant flow $Q_1-Q_2$ is directed towards the power steering cylinder via the branch path 45 so that such steering cylinder will be operated at a predetermined rate. Flow of the sum of the surplus flow obtained in the outlet port 353 of first valve means 347 and the constant flow $Q_2$ obtained in the port 356 of second valve means 348 is directed towards the lift cylinder via branch path 46 at such normal engine speeds.

When engine speed is lower than a speed at which output flow of the pump is made equal to $Q_2$, all of the fluid from the pump is directed through orifices 371 and 381 of the first and second valve means 347 and 348 towards the lift cylinder via branch path 46. When engine is operated at a speed between the speed, at which output flow of the pump is made equal to $Q_2$, and a speed at which output flow of the pump is made equal to $Q_1$, flow having a value subtracted $Q_2$ from such output flow of the pump is directed from the surplus flow outlet port 355 towards the power cylinder via branch path 45 while flow having the constant value $Q_2$ is directed from the constant flow outlet port 356 of second valve means 348 towards the lift cylinder via branch path 46.

Here again, a charasteristic similar to that shown in FIG. 13 may thus be obtained by the hydraulic system shown in FIG. 14. The first and second control valve means 347 and 348 may be constructed similarly to the first and second control valve means 247 and 248 shown in FIG. 12.

We claim:

1. In a working vehicle comprising a hydraulic power steering mechanism, including a power cylinder, and a hydraulic lift mechanism including a lift cylinder, said power cylinder and said lift cylinder being powered by a single pump driven by engine, a hydraulic system comprising:
  a first flow control valve means (47) which includes an inlet port (50) connected to said pump (43) and is operable to divide its inflow into a predetermined constant flow and a surplus flow in excess of said constant flow, said first flow control valve means further including a constant flow outlet port (51) for flowing out said constant flow and a surplus flow outlet port (53) for flowing out said surplus flow, and said surplus flow outlet port being connected to a first fluid supply path (46) which is connected to said lift cylinder (31) via a lift control valve (33); and a second flow control valve means (48) which includes an inlet port (54) connected to said constant flow outlet port (51) and is operable to divide its inflow into first and second proportional control flows of a predetermined ratio, said second flow control valve means further including first and second control flow outlet ports for flowing out said first and second control flows respectively, said first control flow outlet port (55) being connected to a second fluid supply path (45) which is connected to said power cylinder (25) via a steering control valve (26), and said second control flow outlet port (56) being connected to said first fluid supply path (46).

2. A hydraulic system as claimed in claim 1 in which said second flow control valve means (48) comprises a first orifice (57) incorporated between said inlet port (54) of said second flow control valve means and said first control flow outlet port (55) and a second orifice (58) incorporated between the said inlet port (54) and said second control flow outlet port (56), flow areas of said first and second orifices being preset so as to obtain said predetermined flow ratio.

3. A hydraulic system as claimed in claim 2 in which said second flow control valve means (48) comprises a single valve body (48A) biased towards one and the other directions by a pair of springs (95, 96), said first and second orifices (57, 58) being provided by first and second perforations formed in said single valve body.

* * * * *